United States Patent [19]

Fujiwara et al.

[11] 4,287,075
[45] Sep. 1, 1981

[54] HIGH DIELECTRIC CONSTANT TYPE CERAMIC COMPOSITION CONSISTING ESSENTIALLY OF $Pb(Fe_{1/2}Nb_{1/2})O_3$-$Pb(Mg_{1/3}Nb_{2/3})O_3$-$Pb(Mg_{1/2}W_{1/2})O_3$

[75] Inventors: Shinobu Fujiwara; Kiyoshi Furukawa; Nobuaki Kikuchi, all of Akita; Osamu Iizawa, Honjo; Hitoshi Tanaka, Akita; Hisayoshi Ueoka, Yachiyo, all of Japan

[73] Assignee: TDK Electronics Co., Ltd., Tokyo, Japan

[21] Appl. No.: 30,384

[22] Filed: Apr. 16, 1979

[30] Foreign Application Priority Data

| Apr. 17, 1978 | [JP] | Japan | 53/44964 |
| May 29, 1978 | [JP] | Japan | 53/64130 |
| May 30, 1978 | [JP] | Japan | 53/64513 |
| May 30, 1978 | [JP] | Japan | 53/64515 |
| May 30, 1978 | [JP] | Japan | 53/64516 |
| Jun. 16, 1978 | [JP] | Japan | 53/73012 |
| Jun. 22, 1978 | [JP] | Japan | 53/75630 |
| Jul. 3, 1978 | [JP] | Japan | 53/80651 |

[51] Int. Cl.³ ............................................. H01B 3/12
[52] U.S. Cl. ........................................... 106/39.5
[58] Field of Search ..................... 252/63.2, 63.5; 106/39.5; 361/321, 320

[56] References Cited

U.S. PATENT DOCUMENTS

| 2,805,165 | 9/1957 | Goodman | 106/39.5 |
| 3,116,262 | 12/1963 | Goodman | 106/39.5 X |
| 3,464,785 | 9/1969 | Galasso | 252/63.5 X |
| 3,600,652 | 8/1971 | Riley | 252/63.2 X |
| 3,666,665 | 5/1972 | Chapman et al. | 108/39.5 X |
| 4,078,938 | 3/1978 | Yonezawa et al. | 252/63.5 X |

FOREIGN PATENT DOCUMENTS 4633269 9/1971 Japan .................. 252/63.5

Primary Examiner—Harris A. Pitlick
Attorney, Agent, or Firm—Kenyon & Kenyon

[57] ABSTRACT

A novel ceramic composition exhibiting a solid solution structure of $Pb(Fe_{1/2}Nb_{1/2})O_3$-$Pb(Mg_{1/3}Nb_{2/3})O_3$-$Pb(Mg_{1/2}W_{1/2})O_3$, can be sintered at a low sintering temperature; have a high insulation resistance; have a relatively high dielectric constant in the high dielectric type ceramic dielectrics, and; have a low dielectric loss.

A particular amount of the additives, i.e., $Pb(Mn_{2/3}W_{1/3})O_3$, $Pb(Mb_{1/2}W_{1/2})O_3$, $Pb(Mn_{1/2}Nb_{2/3})O_3$, MnO, $Pb(Mn_{1/3}Ta_{2/3})O_3$, $Li_2O$, $Cr_2O_3$ and $CeO_2$, is added into the composition mentioned above.

41 Claims, 1 Drawing Figure

Fig. 1

HIGH DIELECTRIC CONSTANT TYPE CERAMIC COMPOSITION CONSISTING ESSENTIALLY OF $Pb(Fe_{1/2}Nb_{1/2})O_3$-$Pb(Mg_{1/3}Nb_{2/3})O_3$-$Pb(Mg_{1/2}W_{1/2})O_3$

The present invention relates to a ceramic dielectric composition, which can be classified into a high dielectric constant type and a temperature-compensating type, and relates more particularly to the former type ceramic dielectric composition, which is characterized by being sintered at a relatively low temperature, exhibiting a high dielectric constant, a reduced dielectric loss, a low dependence of the properties upon temperature and enhanced insulation resistance. This ceramic dielectric composition is particularly suitable for "high dielectric constant" capacitors of a compact-type with large capacity, such as laminar capacitors.

Most ceramic dielectrics heretofore proposed for high dielectric constant capacitors contain, as the basic ingredient, a compound having a perovskite structure, such as barium titanate ($BaTiO_3$), barium stannate ($BaSnO_3$) and calcium titanate ($CaTiO_3$). Depending upon various requirements in using the dielectrics in the capacitors, an additional element, which constitutes the substitutional solid solution of the basic ingredient, is used for increasing the dielectric constant of ceramic dielectrics. A compound having a structure different from the perovskite structure, can be mixed with the basic ingredient so as to increase the dielectric constant of the ceramic dielectrics. In the most widely used dielectrics, the dielectric constant thereof is increased as mentioned above. In such increase of the dielectric constant, the Curie point of the dielectrics can be adjusted to a value corresponding to that at room temperature, so as to increase the dielectric constant to the maximum value, for example, from 4000 to 20000, which can be achieved by a dielectric comprising a particular basic ingredient. The temperature dependence of the dielectric constant of such dielectric is, however, increased by the increase of the dielectric constant. On the other hand, when the temperature dependence of the dielectric constant is decreased, the maximum value of dielectric constant is disadvantageously decreased.

Suitable sintering temperatures of the ceramic dielectric compositions mentioned above are generally 1200° to 1400° C. Accordingly, a large amount of heat energy is required for sintering. In addition, due to the high sintering temperature of from 1200° to 1400° C., the sintering furnace is considerably deteriorated and eroded during the sintering. As a result, the maintenance cost of the sintering furnace becomes, therefore, expensive.

Recently, a ceramic capacitor which is more compact and of more improved capacity, and possesses a high reliability, has been desired in the field, including the communication industry. Thus, a capacitor of a thin ceramic film having a 0.1 to 0.2 mm thickness and a ceramic laminar capacitor composed of a plurality of superimposed laminae, each having a thickness of approximately 50 microns or less, have been put to practical use.

In the production of the laminar ceramic capacitor, the laminated dielectric body, must be sintered, while the internal electodes of the ceramic capacitor are inserted in the laminated body. Since the sintering temperature of the conventional ceramic dielectrics exceeds 1000° C., a noble metal, such as platinum or palladium, or their alloys had to be used as the internal electrodes, because the stable resistance of the electrodes at a temperature as high as 1300° C. could be provided by the noble metal.

It is proposed in German Offenlegungsschrift No. 27 01 411 that the sintering temperature of a high dielectric constant type ceramic composition be lowered to 1000° C. or less by preparing the composition from two components, i.e. $Pb(Fe_{2/3}W_{1/3})_xO_3$ and $Pb(Fe_{1/2}Nb_{1/2})_{1-x}O_3$. Since the laminated ceramic capacitor can be produced by a low sintering temperatue of less than 1000° C., according to the proposal in the German Offenlegungsschrift, cheap materials such as silver, nickel, aluminum, and the like, can be used as the internal electrodes of the capacitor, and therefore, the production cost of the capacitor can advantageously be lowered from that of the prior art.

It is an object of the present invention to provide ceramic dielectric compositions which: can be sintered at a low sintering temperature; have a high insulation resistance; have a relatively high dielectric constant in the high dielectric type ceramic dielectrics, and; have a low dielectric loss.

It is another object of the present invention to improve properties, such as the dielectric constant, the insulation resistance and the dielectric loss of the known, high dielectric constant type ceramic composition, which can be sintered at a low sintering temperature.

It is still another object of the present invention to provide ceramic capacitors of enhanced reliability, i.e., low dependence of insulation resistance upon ambient and sintering temperatures.

It is a further object of the present invention to provide ceramic dielectric compositions particularly suitable for a high dielectric constant type capacitor of a compact and laminar type.

Other objects and advantages will be apparent from the following description.

BRIEF DESCRIPTION OF THE DRAWING

The present invention is explained with reference to the single FIGURE, in which the ternary composition range of $Pb(Fe_{1/2}Nb_{1/2})WO_3$-$Pb(Mg_{1/3}Nb_{2/3})O_3$-$Pb(Mg_{1/2}W_{1/2})O_3$ is illustrated.

SUMMARY OF THE INVENTION

In accordance with the objects of the present invention there is provided a high dielectric constant type-, ceramic composition, hereinafter referred to as the basic ceramic composition, which comprises from 64.80 to 68.58% of PbO, from 0 to 11.46% of $Fe_2O_3$, from 0.3 to 3.92% of MgO, from 9.65 to 26.89% of $Nb_2O_5$ and from 0 to 16.83% of $WO_3$, all percentages being by weight based on the basic ceramic composition. When the basic ceramic composition comprises certain amounts of $Fe_2O_3$ and $WO_3$, the basic ceramic composition constitutes a ternary composition of $Pb(Fe_{1/2}Nb_{1/2})O_3$-$Pb(Mg_{1/3}Nb_{2/3})O_3$- -$Pb(Mg_{1/2}N_{1/2})O_3$. The amount of such ternary composition is preferably within the area defined by the polygon A-B-C-D-E of FIG. 1, but not including the lines A-B-C-D-E.

DETAILED DESCRIPTION OF THE INVENTION

Provided in accordance with the objects of the present invention are the following dielectric compositions A through G.

A. A modified ceramic composition comprises the basic ceramic composition, i.e., from 64.80 to 68.58% of PbO, from 0 to 11.46% of $Fe_2O_3$, from 0.3 to 3.92% of MgO, from 9.65 to 26.89% of $Nb_2O_5$, and from 0 to 16.83% of $WO_3$, all these percentages being by weight based on the ceramic composition and further comprises MnO in an amount of from 0.001 to 1.0 part by weight based on 100 weight parts of the basic ceramic composition.

B. A modified ceramic composition comprises the basic ceramic composition and $Pb(Mn_{2/3}W_{1/2})O_3$ in an amount of from 0.05 to 5.0 parts by weight based on 100 weight parts of the basic ceramic composition.

C. A modified ceramic composition comprises the basic ceramic composition and $Pb(Mn_{1/2}W_{1/2})O_3$ in an amount of from 0.05 to 5.0 parts by weight based on 100 weight parts of the basic ceramic composition.

D. A modified ceramic composition comprises the basic ceramic composition and $Pb(Mn_{1/3}Nb_{2/3})O_3$ in an amount of from 0.05 to 5.0 parts by weight based on 100 weight parts of the basic ceramic composition.

E. A modified ceramic composition comprises the basic ceramic composition and $Pb(Mn_{1/3}Ta_{2/3})O_3$ in an amount of from 0.05 to 5.0 parts by weight based on 100 weight parts of the basic ceramic composition.

F. A modified ceramic composition comprises the basic ceramic composition and $Li_2O$ in an amount of from 0.01 to 2.0 parts by weight based on 100 weight parts of the basic ceramic composition.

G. A modified ceramic composition comprises the basic ceramic composition and further comprises at least one member selected from the group consisting of $Cr_2O_3$ and $CeO_2$ in an amount of from 0.05 to 2.0 parts by weight based on 100 parts of the basic ceramic composition.

In the modified ceramic compositions, the maximum PbO content may be 68.50%.

The properties and the embodiments of the ceramic compositions according to the present invention will now be illustrated.

Figure 1:
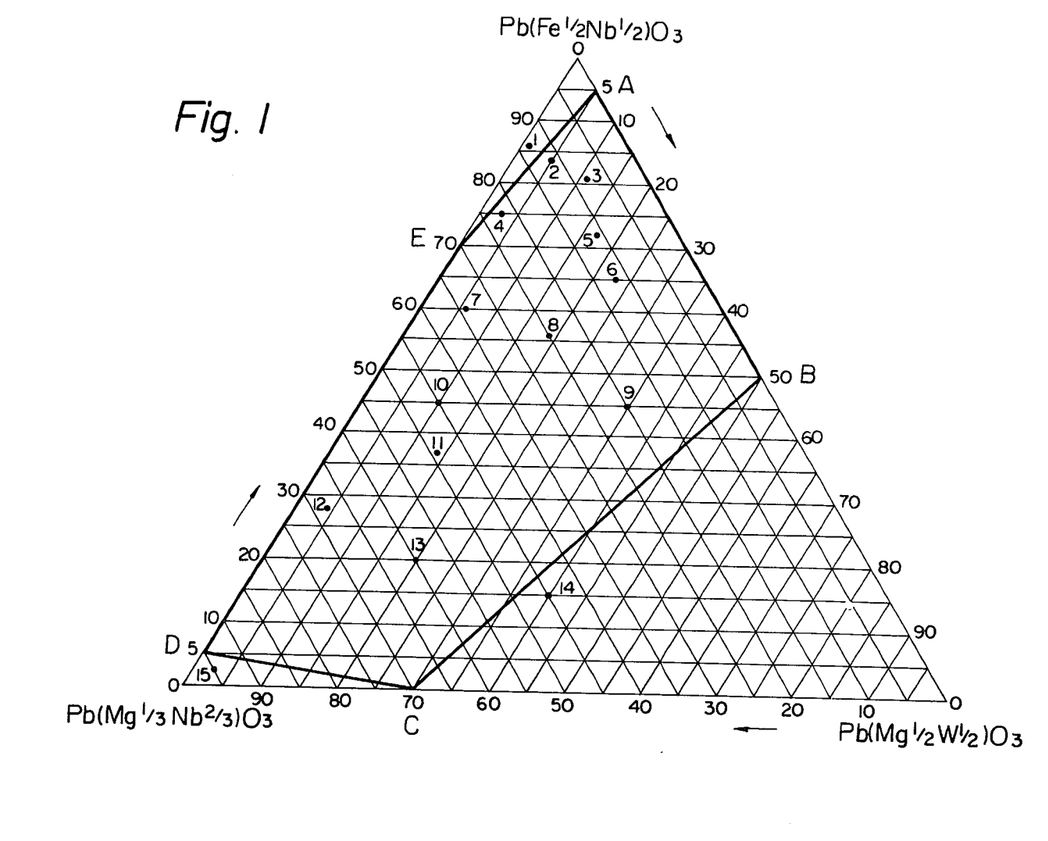

Every high dielectric constant type ceramic composition according to the present invention can be sintered at a low temperature ranging from 800° to less than 1000° C. When the PbO content in the ceramic compositions is more than the respective maximum amounts defined in the description of the basic ceramic composition, the ceramic compositions must be sintered at a temperature exceeding 1000° C. On the other hand, when the PbO content is less than 64.80% by weight, the dielectric constant of the ceramic composition is too low. the insulation resistance of the ceramic compositions is decreased when the $Fe_2O_3$ content is more than 11.46% by weight. When the MgO content is more than 3.92% by weight, the sintering temperature is increased and the dielectric constant is decreased. On the other hand, when the MgO content is less than 0.3% by weight, the insulation resistance is decreased and the dielectric loss (tan δ) is increased. With regard to the $Nb_2O_5$ content, it has been found that the dielectric constant is too low when the $Nb_2O_5$ content is more than 26.89%, while the insulation resistance is decreased when the $Nb_2O_5$ content is less than 9.65%. When the $WO_3$ content exceeds 16.83%, the dielectric constant is too low. It is therefore apparent that a high dielectric constant and a high insulation resistance as well as a low sintering temperature and a low dielectric loss are provided by the basic ceramic composition of the present invention. These compositions correspond (although not strictly) to a novel, binary solid solution in the field of ceramic dielectrics, i.e., solid solutions of $Pb(Mg_{1/3}Nb_{2/3})O_3$- -$Pb(Mg_{1/2}W_{1/2})O_3$, as well as a novel ternary composition of $Pb(Fe_{1/2}Nb_{1/2})O_3$-$Pb(Mg_{1/3}Nb_{2/3})O_3$-$Pb(Mg_{1/2}W_{1/2})O_3$. Each of the basic ceramic composition preferably has a composition corresponding to the area difiend by the polygon A-B-C-D-E of FIG. 1. Referring to FIG. 1, when the values of the $Pb(Mg_{1/2}W_{1/2})O_3$ content are equal to or greater than the values defined by the line B—C, the dielectric constant at room temperature is disadvantageously reduced so that the ceramic composition cannot be used on a practical basis. When the values of the $Pb(Mg_{1/3}Nb_{2/3})O_3$ content are equal to or greater than the values defined by the line C—D, the sintering temperature becomes higher than 1000° C. and is thus unpreferable. When the values of the $Pb(Mg_{1/2}Nb_{1/2})$ content are equal to or greater than the values deflined by the line A—E, the dielectric constant at room temperature is too low.

In the basic ceramic composition which are capable of being sintered at a temperature of lower than 1000° C. according to the present invention, the relative dielectric constant (εs), which is simply referred to as the dielectric constant in the present specification, is approximately from 6000 to 23000 and therefore high. Furthermore, the dielectric loss (tan ε at 1 KHz) is from 0.9 to 2.7% and therefore low. A preferable basic ceramic composition comprises from 66.45 to 68.08% of PbO, from 3.41 to 9.73% of $Fe_2O_3$, 0.99 to 3.03% of MgO, from 16.03 to 24.06% of $Nb_2O_5$ and from 1.42 to 7.93% of $WO_3$, and exhibits a dielectric constant of more than approximately 15000. A more preferable basic ceramic composition comprises from 66.7 to 67.2% of PbO, from 8.5 to 9.73% of $Fe_2O_3$, from 17.0 to 18.4% of $Nb_2O_5$, from 0.99 to 1.5% of MgO and from 3.8 to 6.0% of $WO_3$ and exhibits a dielectric constant of approximately 20000 or more. The insulation resistance described in the present specification indicates the resistance of a ceramic composition having a thickness of approximately 0.5 mm. Such resistance value is measured at 20° C. when a dielectric current of 500 volts is applied to the ceramic composition.

By adding a particular amount of the additives, i.e., $Pb(Mn_{2/3}W_{1/3})O_3$, $Pb(Mn_{1/2}W_{1/2})O_3$, $Pb(Mn_{1/3}Nb_{2/3})O_3$, MnO, $Pb(Mn_{1/3}Ta_{2/3})O_3$, $Li_2O$, $Cr_2O_3$ and $CeO_2$, into the basic ceramic composition particularly into the preferable or more preferable basic compositions mentioned above, the dielectric loss and the insulation resistance of the basic ceramic composition can be decreased to a level lower than that of the basic ceramic compositions. Furthermore, the dielectric constant can be increased by such additives to a level higher than that of the basic composition preferably higher than 20000. When the content of these additives exceeds the maximum amount defined in the description of the modified ceramic compositions, the dielectric constant (ε s) is disadvantageously reduced and the dielectric loss (tan δ) and the insulation resistance are both reduced to levels lower than the levels at which the ceramic composition can be used on a practical basis.

It has been established that the addition of the above additives basically exerts an influence on the electrical properties i.e., $\epsilon$ s and tan $\delta$, of the ceramic composition, as mentioned hereinbeofre. However, it has also been found that an addition of $Li_2O$, which exceeds the defined maximum amount, into the basic ceramic composition will increase the sintering temperature.

A modified ceramic composition containing $Pb(Mn_{2/3}W_{1/3})O_3$ and capable of being sintered at a temperature of lower than 1000° C. may exhibit a dielectric constant ($\epsilon$ s) of from approximately 4600 to 17200, a dielectric loss (tan $\delta$ at 1 KHz) of from 0.7 to 1.8%, and an insulation resistance of from $2\times10^{10}$ to $6\times10^{10}\Omega$. The additive content is preferably from 0.05 to 0.5 part by weight, and the basic composition is preferably from 67.49 to 67.66% of PbO, from 7.26 to 10.14% of $Fe_2O_3$, from 19.85 to 21.22% of $Nb_2O_5$, from 0.76 to 1.75% of MgO, and from 1.76 to 2.11% of $WO_3$. When the additive content and the basic composition fall within the above respective preferable ranges, the dielectric loss (tan $\delta$ at 1 KHz) is 1.8% or less and the dielectric constant is approximately 10000 or more.

Another modified ceramic composition containing $Pb(Mn_{1/2}W_{1/2})O_3$ and capable of being sintered at a temperature of less than 1000° C. may exhibit a dielectric constant ($\epsilon$ s) of from approximately 4700 to 17300, a dielectric loss (tan $\delta$) of from 0.6 to 1.9%, and an insulation resistance of from $1\times10^{10}$ to $4\times10^{10}\Omega$. The additive content is preferably from 0.05 to 0.5 part by weight. The basic composition is preferably from 67.49 to 67.66% of PbO, from 7.26 to 10.14% of $Fe_2O_3$, from 19.85 to 21.22% of $Nb_2O_5$, from 0.76 to 1.75% of MgO and from 1.76 to 2.11% of $WO_3$. When the additive content and the basic composition fall within the above respective preferable ranges, the dielectric constant is approximately 10000 or more and the dielectric loss (tan $\delta$ at 1 KHz) is 1.3% or less.

A modified ceramic composition containing a $Pb(Mn_{1/3}Nb_{2/3})O_3$ additive and capable of being sintered at a temperature of lower than 1000° C. may exhibit a dielectric constant ($\delta$ s) of from approximately 4800 to 17200, a dielectric loss (tan $\delta$ at 1 KHz) of from 0.4 to 2%, and an insulation resistance of from $2\times10^{10}$ to $6\times10^{10}\Omega$. The additive content is preferably from 0.05 to 0.5 part by weight. The basic composition comprises preferably from 67.49 to 67.66% of PbO, from 7.26 to 10.14% of $Fe_2O_3$, from 19.85 to 21.22% of $Nb_2O_5$, from 0.76 to 1.75% of mgO and from 1.76 to 2.11% of $WO_3$. When the additive content and the content of the basic composition fall within the above preferable ranges, the dielectric constant is approximately 10000 or more.

A modified ceramic composition containing $Pb(Mn_{1/3}Ta_{2/3})O_3$ and capable of being sintered at a temperature of lower than 1000° C. may exhibit a dielectric constant ($\epsilon$ s) of from approximately 4360 to 18200, a dielectric loss (tan $\delta$ at 1 KHz) of from 0.4 to 1.7% and an insulation resistance of from $1\times10^{10}$ to $6\times10^{10}\Omega$.

The additive content is preferably from 0.05 to 0.5 part by weight. The basic composition comprises perferably from 67.49 to 67.66% of PbO, from 7.26 to 10.14% of $Fe_2O_3$, from 19.85 to 21.22% of $Nb_2O_5$, from 0.76 to 1.75% of MgO and from 1.76 to 2.11% of $WO_3$. When the additive content and the content of the basic composition fall within the above preferable ranges, the dielectric constant is approximately 10000 or more.

A modified composition containing the $Li_2O$ additive and capable of being sintered at a temperature of lower than 1000° C. exhibit a dielectric constant ($\delta$ s) of from approximately 9000 to 22000, and a dielectric loss (tan $\epsilon$ at 1 KHz) of from 0.7 to 1.5%. The additive content is preferably from 0.01 to 0.1 part by weight. The basic composition compresses preferably from 66.7% to 67.51% of PbO, from 5.43 to 8.60% of $Fe_2O_3$, from 17.24 to 21.11% of $Nb_2O_5$, from 1.47 to 2.44% of MgO and from 3.51 to 5.90% of $WO_3$. When the additive content and the basic component content fall within the above preferable ranges, the dielectric constant is approximately 14000 or more. The additive content is more preferably from 0.01 to 0.05 part by weight. The basic composition comprises more preferably from 66.79 to 67.00% of PbO, from 8.00 to 8.60% of $Fe_2O_3$, 17.24 to 18.00% of $Nb_2O_5$, from 1.47 to 1.60% of MgO and from 5.00 to 5.90% of $WO_3$. When the additive content and basic component content fall within the above preferable ranges.

A modified composition containing the $Cr_2O_3$ and/or $CeO_2$ additive and capable of being sintered at a temperature of lower than 1000° C. may exhibit a dielectric constant ($\epsilon$ s) of from approximately 6620 to 23800, a dielectric loss (tan $\delta$ at 1 KHz) of from 0.8 to 2.6%, and an insulation resistance of from $2\times10^9$ to $9\times10^{10}\Omega$. The basic composition is preferably from 66.79 to 67.66% of PbO, from 7.26 to 8.60% of $Fe_2O_3$, from 17.24 to 21.22% of $Nb_2O_5$ and from 1.47 to 1.75% of MgO, and from 2.11 to 5.90% of $WO_3$. When the basic composition falls within the above preferable range, the dielectric constant is approximately 17000 or more, and the dielectric loss (tan $\delta$ at 1 KHz) is 2.0% or less. When the content of $Cr_2O_3$ and/or $CeO_2$ is from 0.5 l to 1.0 part by weight and, further, the basic composition falls within the above more preferable range, the dielectric loss (tan $\delta$ at 1 KHz) is less than 2% and the insulation resistance is more than $10^{10}\Omega$.

A modified composition containing MnO and capable of being sintered at a temperature of lowes than 1000° C. may exhibit a dielectric constant ($\epsilon$ s) of from approximately 5200 to 22300 a dielectric loss (tan $\delta$ at 1 KHz) of from 0.6 to 1.3%, and an insulation resistance of from $2\times10^{10}$ to $5\times10^{10}\Omega$. The additive content is preferably from 0.001 to less than 0.5 part by weight. When the additive content falls within the above preferable range, the dielectric loss (tan $\delta$ at 1 KHz) is approximately 1% or less. The basic composition is preferably from 66.79 to 67.66% of PbO, from 7.26 to 8.60% of $Fe_2O_3$, from 17.24 to 21.22 of $Nb_2O_5$ and from 1.47 to 1.75% of MgO, and from 2.11 to 5.90% of $WO_3$. When the basic composition falls within the above preferable range the dielectric constant is approximately 13000 or more, and the dielectric loss (tan $\delta$ at 1 KHz) is 2.0% or less. The basic composition is more preferably from 66.79 to 67.00% of PbO, from 8.00 to 8.60% of $Fe_2O_3$, from 17.24 to 18.00% of $Nb_2O_5$, from 1.47 to 1.55% of MgO and from 5.00 to 5.99% of $WO_3$. When the basic composition falls within the above more preferable range, the dielectric constant is approximately 16000 or more. When the content of MnO is from 0.001 to 0.1 part by weight and, further, the basic composition falls within the above more preferable range, the dielectric constant is more than approximately 20000, (tan $\delta$ at 1 KHz) is less than 1% and the insulation resistance is more than $10^{10}\Omega$.

Generally speaking, the additives according to the present invention can provide the modified ceramic composition with a dielectric constnat, dielectric loss and insulation resistance which are equivalent or superior to those of the basic ceramic composition, while the sintering temperature of the former composition is kept lower than that of the latter composition. Therefore, the dielectric constant, the dielectric loss and the insulation resistance of modified compositions are dependent upon the basic compositions.

The following additives, $Pb(Mn_{2/3}W_{1/3})O_3$, $Pb(Mn_{1/2}W_{1/3})O_3$, $Pb(Mn_{1/3}Nb_{2/3})O_3$, $Pb(Mn_{1/3}Ta_{2/3})O_3$, and MnO, increase the insulation resistance and decrease the dielectric loss of the basic compositions. When these additives are added to the basic composition, which comprises from 66.45 to 68.08% of PbO, from 3.41 to 9.73% of $Fe_2O_3$, from 0.99 to 3.03% of MgO, from 16.03 to 24.06% of $Nb_2O_5$ and from 1.42 to 7.93% of $WO_3$, the insulation resistance can be more than $1 \times 10^{10} \Omega$, and the dielectric loss (tan $\delta$ at 1 KHz) can be less than 2.5%. The dielectric constant can be maintained at approximately 15000 or more by adjusting the amount of the additives. When these additives are added to the basic composition, which comprises from 66.7 to 67.2% of PbO, from 8.5 to 9.8% of $Fe_2O_3$, from 17.0 to 18.4% of $Nb_2O_5$, from 0.99 to 1.5% of MgO and from 3.8 to 6.0% of $WO_3$, the insulation resistance can be more than $2 \times 10^{10} \Omega$, and the dielectric loss (tan $\delta$ at 1 KHz) can be less than 2.0%. The dielectric constant can be maintained at approximately 20,000 or more by adjusting the additive content.

The ceramic compositions according to the present invention exhibit a high insulation resistance and can therefore be used for forming a high-voltage capacitor. In addition, these ceramic compositions can be used in the capacitor as a thin film having a thickness of from 20 to 50 microns. The high insulation resistance can be utilized to solve the problem of electromigration, which causes the properties of a capacitor to be deteriorated, according to the type of ions of a ceramic composition being moved therein under the effect of a voltage applied from the capacitor electrode to the ceramic composition.

The $Cr_2O_3$ and $CeO_2$ additives can increase the dielectric constant and the insulation resistance and also decrease the dielectric loss. When these additives are added to the basic composition which comprises from 66.45 to 68.08% of PbO, from 3.41 to 9.73% of $Fe_2O_3$, from 0.99 to 3.03% of MgO, from 16.03 to 24.06% of $Nb_2O_5$ and from 1.42 to 7.93% of $WO_3$, the dielectric constnat and the insulation resistance can be mroe than approximately 16,000 and $2 \times 10^{10} \Omega$, respectively, and the dielectric loss can be less than 2.5%. When these additives are added to the basic composition, which comprises from 66.7 to 67.2% of PbO, from 8.5 to 9.8% of $Fe_2O_3$, from 17.0 to 18.4% of $Nb_2O_5$, from 0.99 to 1.5% of MgO and from 3.8 to 6.0% of $WO_3$, the dielectric constant and the insulation resistance can be more than 20,000 and $7 \times 10^{10} \Omega$, respectively, and the dielectric loss (tan $\delta$ at 1 KHz) can be less than 2.0%. The $Li_2O$ additive can decrease the dielectric loss. When this additive is added to the basic composition, which comprises from 66.45 to 68.08% of PbO, from 3.41 to 9.73% of $Fe_2O_3$, from 0.99 to 3.03% of MgO, from 16.03 to 24.06% of $Nb_2O_5$ and from 1.42 to 7.93% of $WO_3$, the dielectric loss (tan $\delta$ at 1 KHz) can be less than 2.5%. The dielectric constant can be maintained at approximately 5,000 or more by adjusting the amount of the additives.

One of the properties which must be provided in any capacitor is the property of maintaining a low dependence of the dielectric constant, the dielectric loss and the insulation resistance upon temperature. The ceramic compositions according to the present invention exhibit the above-mentioned low dependence. The dielectric constant of the basic ceramic composition is increased or decreased by a temperature increase of from room temperature to 85° C. in an amount not exceeding approximately −70%. The following additives, i.e., $Pb(Mn_{2/3}W_{1/3})O_3$, $Pb(Mn_{1/2}W_{1/2})O_3$, $Pb(Mn_{1/3}Nb_{2/3})O_3$ and $Pb(Mn_{1/3}Ta_{2/3})O_3$, can be used to further reduce and thus stabilize the temperature dependence.

One of the properties which must be provided in any PbO containing ceramic is the property of preventing vaporization of the PbO during sintering. The manganese containing additives can effectively prevent the PbO vaporization and can thus contribute to the stabilization of the sintering process.

The ceramic dielectric compositions of the present invention may be prepared as follows. Finely divided particles or powders of respective metal oxides are blended with each other using a ball mill and shaped into a suitable form. After a binder is added to the powders, the powders are press-formed, for example, into discs. The discs are sintered at a temperature of from 800° to 1000° C. for a period of one to two hours, enclosed in a magnesia ceramic vessel. Each disc is plated with a silver, nickel or aluminum electrode. Instead of metal oxides, metal carbonates may be used.

The present invention is explained further in detail by way of a single example.

EXAMPLE

In the example, the lead oxide (PbO), magnesium oxide (MgO), iron oxide ($Fe_2O_3$), niobium oxide ($Nb_2O_5$), manganese oxide (MnO), tungsten oxide ($WO_3$), lithium oxide ($Li_2O$), chromium oxide ($Cr_2O_3$) and cerium oxide ($CeO_2$), all in powdered form, were weighted so that the oxides were contained in the ceramic composition in the proportion as shown in Table 1, below. These oxide mixture serving as the raw material of the ceramic compositions were blended in a bowl made of an organic resin under a moist condition and thereafter presintered at a temperature ranging from 700° to 850° C. over a period of two hours. Subsequently, chemical reactions occurred between the powders. The so-reacted sintered powders were crushed to a particles having a diameter of a few microns and were blended again with each other so as to obtain a powdered mixture. A predetermined amount of binder of polyvinyl alcohol (PVA) was added into the powdered mixture, which was then shaped under a shaping pressure of approximately 3 tons/cm² into discs having a diameter of 16.5 mm and a thickness of 0.6 mm. The shaped discs were air-tightly sealed in a magnesia ceramic vessel so as to prevent the lead component from being evaporated from the discs during sintering. The final sintering was carried out over a period of two hours, and ceramic bodies were produced. Thereafter, a silver electrode was baked onto each side of the ceramic bodies. The ceramic bodies with the pair of electrodes were used as samples for measuring electric properties, i.e., the dielectric constant ($\epsilon$s at 1 KHz), the dielectric loss (tan $\delta$ at 1 KHz) in %, and the insulation resistance (IR) in $\Omega$, the temperature dependence of the dielectric constant ($\epsilon$s at 1 KHz) was measured with regard to several samples. Such temperature dependence was measured at 85° C. based on the room temperature of 20° C. as the standard value. The measurement results are shown in Table 1, in which the asterisked samples designate the control sample and the components A, B and C designate $Pb(Fe_{1/2}Nb_{1/2})O_3$, $Pb(Mg_{1/3}Nb_{2/3})O_3$, and $Pb(Mg_{1/2}W_{1/2})O_3$ respectively.

TABLE 1

| Sample No. | Basic Ingredients (mol %) A | B | C | Additive (wt part) | Proportion of Oxides PbO | $Fe_2O_3$ | $Nb_2O_5$ | MgO | $WO_3$ | Electric Properties $\epsilon_s$ | tan δ | I R |
|---|---|---|---|---|---|---|---|---|---|---|---|---|
| 1* | 86 | 13 | 1 | 0 | 67.80 | 10.43 | 20.83 | 0.59 | 0.35 | 5350 | 4.0 | — |
| 2 | 84 | 11 | 5 | 0 | 67.49 | 10.14 | 19.85 | 0.76 | 1.76 | 12500 | 2.5 | $1 \times 10^7$ |
| 3 | 81 | 8 | 11 | 0 | 67.13 | 9.73 | 13.32 | 0.99 | 3.83 | 21000 | 1.5 | — |
| 4 | 75 | 22 | 3 | 0 | 67.74 | 9.09 | 21.04 | 1.08 | 1.05 | 11100 | 2.0 | — |
| 5 | 72 | 11 | 17 | 0 | 66.79 | 8.60 | 17.24 | 1.47 | 5.90 | 22650 | 2.0 | $6 \times 10^7$ |
| 6 | 65 | 12 | 23 | 0 | 66.45 | 7.73 | 16.03 | 1.86 | 7.93 | 17280 | 2.1 | — |
| 7 | 60 | 34 | 6 | 0 | 67.66 | 7.26 | 21.22 | 1.75 | 2.11 | 18120 | 1.2 | $1 \times 10^7$ |
| 8 | 56 | 25 | 19 | 0 | 66.80 | 6.69 | 17.77 | 2.15 | 6.59 | 15810 | 2.3 | — |
| 9 | 45 | 20 | 35 | 0 | 65.82 | 5.30 | 14.05 | 2.87 | 11.96 | 6750 | 2.7 | $2 \times 10^7$ |
| 10 | 45 | 45 | 10 | 0 | 67.51 | 5.43 | 21.11 | 2.44 | 3.51 | 18750 | 2.5 | $2 \times 10^8$ |
| 11 | 37 | 49 | 14 | 0 | 67.31 | 4.45 | 20.51 | 2.84 | 4.89 | 12870 | 1.6 | — |
| 12 | 28 | 68 | 4 | 0 | 68.08 | 3.41 | 24.06 | 3.03 | 1.42 | 16120 | 0.9 | — |
| 13 | 20 | 60 | 20 | 0 | 67.04 | 2.40 | 19.96 | 3.63 | 6.97 | 6310 | 2.2 | $1 \times 10^7$ |
| 14* | 15 | 45 | 40 | 0 | 65.74 | 1.76 | 14.68 | 4.16 | 13.66 | 3100 | 8.7 | — |
| 15* | 2.5 | 95 | 2.5 | 0 | 68.42 | 0.31 | 26.31 | 4.07 | 0.89 | 8510 | 0.8 | — |

| Sample No. | Basic Ingredients (mol %) A | B | C | $Pb(Mn_{\frac{2}{3}}W_{\frac{1}{3}})O_3$ (wt part) | Proportion of Oxides PbO | $Fe_2O_3$ | $Nb_2O_5$ | MgO | $WO_3$ | Electric Properties $\epsilon_s$ | tan δ | I R |
|---|---|---|---|---|---|---|---|---|---|---|---|---|
| 16* | 84 | 11 | 5 | 0 | 67.49 | 10.14 | 19.85 | 0.76 | 1.76 | 12600 | 2.7 | $1 \times 10^7$ |
| 17 | 84 | 11 | 5 | 0.05 | 67.49 | 10.14 | 19.85 | 0.76 | 1.76 | 12000 | 1.8 | $2 \times 10^{10}$ |
| 18 | 84 | 11 | 5 | 0.5 | 67.49 | 10.14 | 19.85 | 0.76 | 1.76 | 10800 | 0.9 | $6 \times 10^{10}$ |
| 19 | 84 | 11 | 5 | 5.0 | 67.49 | 10.14 | 19.85 | 0.76 | 1.76 | 7900 | 1.1 | $2 \times 10^{10}$ |
| 20* | 84 | 11 | 5 | 10.0 | 67.49 | 10.14 | 19.85 | 0.76 | 1.76 | 4300 | 2.6 | $1 \times 10^7$ |
| 21* | 60 | 34 | 6 | 0 | 67.66 | 7.26 | 21.22 | 1.75 | 2.11 | 18130 | 2.1 | $1 \times 10^7$ |
| 22 | 60 | 34 | 6 | 0.05 | 67.66 | 7.26 | 21.22 | 1.75 | 2.11 | 17200 | 1.2 | $2 \times 10^{10}$ |
| 23 | 60 | 34 | 6 | 0.5 | 67.66 | 7.26 | 21.22 | 1.75 | 2.11 | 14900 | 0.7 | $3 \times 10^{10}$ |
| 24 | 60 | 34 | 6 | 5.0 | 67.66 | 7.26 | 21.22 | 1.75 | 2.11 | 12500 | 1.3 | $2 \times 10^{10}$ |
| 25* | 60 | 34 | 6 | 10.0 | 67.66 | 7.26 | 21.22 | 1.75 | 2.11 | 7100 | 2.4 | $2 \times 10^7$ |
| 26* | 20 | 60 | 20 | 0 | 67.04 | 2.40 | 19.96 | 3.63 | 6.97 | 6310 | 2.4 | $1 \times 10^7$ |
| 27 | 20 | 60 | 20 | 0.05 | 67.04 | 2.40 | 19.96 | 3.63 | 6.97 | 6140 | 1.7 | $2 \times 10^{10}$ |
| 28 | 20 | 60 | 20 | 0.5 | 67.04 | 2.40 | 19.96 | 3.63 | 6.97 | 5750 | 0.8 | $5 \times 10^{10}$ |
| 29 | 20 | 60 | 20 | 5.0 | 67.04 | 2.40 | 19.96 | 3.63 | 6.97 | 4600 | 1.5 | $2 \times 10^{10}$ |
| 30* | 20 | 60 | 20 | 10.0 | 67.04 | 2.40 | 19.96 | 3.63 | 6.97 | 3900 | 2.2 | $3 \times 10^7$ |

| Sample No. | Basic Ingredients (mol %) A | B | C | $Pb(Mn_{\frac{1}{2}}W_{\frac{1}{2}})O_3$ (wt part) | Proportion of Oxides PbO | $Fe_2O_3$ | $Nb_2O_5$ | MgO | $WO_3$ | Electric Properties $\epsilon_s$ | tan δ | I R |
|---|---|---|---|---|---|---|---|---|---|---|---|---|
| 31 | 84 | 11 | 5 | 0 | 67.49 | 10.14 | 10.85 | 0.76 | 1.76 | 12700 | 2.5 | $1 \times 10^7$ |
| 32 | 84 | 11 | 5 | 0.05 | 67.49 | 10.14 | 19.85 | 0.76 | 1.76 | 12100 | 1.6 | $1 \times 10^{10}$ |
| 33 | 84 | 11 | 5 | 0.5 | 67.49 | 10.14 | 19.85 | 0.76 | 1.76 | 10900 | 0.8 | $4 \times 10^{10}$ |
| 34 | 84 | 11 | 5 | 5.0 | 67.49 | 10.14 | 19.85 | 0.76 | 1.76 | 8200 | 1.2 | $2 \times 10^{10}$ |
| 35* | 84 | 11 | 5 | 10.0 | 67.49 | 10.14 | 19.85 | 0.76 | 1.76 | 4500 | 2.4 | $2 \times 10^7$ |
| 36* | 60 | 34 | 6 | 0 | 67.66 | 7.26 | 21.22 | 1.75 | 2.11 | 18200 | 2.2 | $1 \times 10^7$ |
| 37 | 60 | 34 | 6 | 0.05 | 67.66 | 7.26 | 21.22 | 1.75 | 2.11 | 17300 | 1.1 | $1 \times 10^{10}$ |
| 38 | 60 | 34 | 6 | 0.5 | 67.66 | 7.26 | 21.22 | 1.75 | 2.11 | 15000 | 0.6 | $3 \times 10^{10}$ |
| 39 | 60 | 34 | 6 | 5.0 | 67.66 | 7.26 | 21.22 | 1.75 | 2.11 | 12600 | 1.9 | $2 \times 10^{10}$ |
| 40* | 60 | 34 | 6 | 10.0 | 67.66 | 7.26 | 21.22 | 1.75 | 2.11 | 7200 | 2.3 | $2 \times 10^7$ |
| 41* | 20 | 60 | 20 | 0 | 67.04 | 2.40 | 19.96 | 3.63 | 6.97 | 6340 | 2.5 | $1 \times 10^7$ |
| 42 | 20 | 60 | 20 | 0.05 | 67.04 | 2.40 | 19.96 | 3.63 | 6.97 | 6150 | 1.8 | $2 \times 10^{10}$ |
| 43 | 20 | 60 | 20 | 0.5 | 67.04 | 2.40 | 19.96 | 3.63 | 6.97 | 5760 | 1.0 | $4 \times 10^{10}$ |
| 44 | 20 | 60 | 20 | 5.0 | 67.04 | 2.40 | 19.96 | 3.63 | 6.97 | 4700 | 1.6 | $1 \times 10^{10}$ |
| 45* | 20 | 60 | 20 | 10.0 | 67.04 | 2.40 | 19.96 | 3.63 | 6.97 | 3800 | 2.5 | $1 \times 10^7$ |

| Sample No. | Basic Ingredients (mol %) A | B | C | $Pb(Mn_{\frac{1}{3}}Nb_{\frac{2}{3}})O_3$ (wt part) | Proportion of Oxides PbO | $Fe_2O_3$ | $Nb_2O_5$ | MgO | $WO_3$ | Electric Properties $\epsilon_s$ | tan δ | I R |
|---|---|---|---|---|---|---|---|---|---|---|---|---|
| 46* | 84 | 11 | 5 | 0 | 67.49 | 10.14 | 19.85 | 0.76 | 1.76 | 12700 | 2.8 | $1 \times 10^7$ |
| 47 | 84 | 11 | 5 | 0.05 | 67.49 | 10.14 | 19.85 | 0.76 | 1.76 | 12100 | 2.0 | $2 \times 10^{10}$ |
| 48 | 84 | 11 | 5 | 0.5 | 67.49 | 10.14 | 19.85 | 0.76 | 1.76 | 10800 | 0.9 | $6 \times 10^{10}$ |
| 49 | 84 | 11 | 5 | 5.0 | 67.49 | 10.14 | 19.85 | 0.76 | 1.76 | 8200 | 1.2 | $3 \times 10^{10}$ |
| 50* | 84 | 11 | 5 | 10.0 | 67.49 | 10.14 | 19.85 | 0.76 | 1.76 | 4500 | 2.9 | $2 \times 10^7$ |
| 51* | 60 | 34 | 6 | 0 | 67.66 | 7.26 | 21.22 | 1.75 | 2.11 | 18120 | 2.1 | $2 \times 10^7$ |
| 52 | 60 | 34 | 6 | 0.05 | 67.66 | 7.26 | 21.22 | 1.75 | 2.11 | 17200 | 1.1 | $2 \times 10^{10}$ |
| 53 | 60 | 34 | 6 | 0.5 | 67.66 | 7.26 | 21.22 | 1.75 | 2.11 | 15400 | 0.3 | $2 \times 10^{10}$ |
| 54 | 60 | 34 | 6 | 5.0 | 67.66 | 7.26 | 21.22 | 1.75 | 2.11 | 11200 | 1.4 | $4 \times 10^{10}$ |
| 55* | 60 | 34 | 6 | 10.0 | 67.66 | 7.26 | 21.22 | 1.75 | 2.11 | 6420 | 2.4 | $2 \times 10^7$ |
| 56* | 20 | 60 | 20 | 0 | 67.04 | 2.40 | 19.96 | 3.63 | 6.97 | 6320 | 2.3 | $2 \times 10^7$ |
| 57 | 20 | 60 | 20 | 0.05 | 67.04 | 2.40 | 19.96 | 3.63 | 6.97 | 5900 | 1.0 | $2 \times 10^{10}$ |
| 58 | 20 | 60 | 20 | 0.5 | 67.04 | 2.40 | 19.96 | 3.63 | 6.97 | 5200 | 0.4 | $3 \times 10^{10}$ |

TABLE 1-continued

| 59 | 20 | 60 | 20 | 5.0 | 67.04 | 2.40 | 19.96 | 3.63 | 6.97 | 4800 | 1.2 | $2 \times 10^{10}$ |
| 60* | 20 | 60 | 20 | 10.0 | 67.04 | 2.40 | 19.96 | 3.63 | 6.97 | 3200 | 2.7 | $1 \times 10^7$ |

| Sample No. | Basic Ingredients (mol %) | | | $Pb(Mn_{1/3}Ta_{2/3})O_3$ (wt part) | Proportion of Oxides | | | | | Electric Properties | | |
|---|---|---|---|---|---|---|---|---|---|---|---|---|
| | A | B | C | | PbO | $Fe_2O_3$ | $Nb_2O_5$ | MgO | $WO_3$ | $\epsilon_s$ | tan δ | I R |
| 61* | 84 | 11 | 5 | 0 | 67.49 | 10.14 | 19.85 | 0.76 | 1.76 | 12650 | 2.6 | $1 \times 10^7$ |
| 62 | 84 | 11 | 5 | 0.05 | 67.49 | 10.14 | 19.85 | 0.76 | 1.76 | 12000 | 1.7 | $2 \times 10^{10}$ |
| 63 | 84 | 11 | 5 | 0.5 | 67.49 | 10.14 | 19.85 | 0.76 | 1.76 | 10700 | 0.9 | $6 \times 10^{10}$ |
| 64 | 84 | 11 | 5 | 5.0 | 67.49 | 10.14 | 19.85 | 0.76 | 1.76 | 8450 | 1.4 | $3 \times 10^{10}$ |
| 65* | 84 | 11 | 5 | 10.0 | 67.49 | 10.14 | 19.85 | 0.76 | 1.76 | 4530 | 2.9 | $1 \times 10^7$ |
| 66* | 60 | 34 | 6 | 0 | 67.66 | 7.26 | 21.22 | 1.75 | 2.11 | 18210 | 2.3 | $2 \times 10^7$ |
| 67 | 60 | 34 | 6 | 0.05 | 67.66 | 7.26 | 21.22 | 1.75 | 2.11 | 17200 | 1.1 | $2 \times 10^{10}$ |
| 68 | 60 | 34 | 6 | 0.5 | 67.66 | 7.26 | 21.22 | 1.75 | 2.11 | 15400 | 0.4 | $4 \times 10^{10}$ |
| 69 | 60 | 34 | 6 | 5.0 | 67.66 | 7.26 | 21.22 | 1.75 | 2.11 | 10300 | 1.0 | $3 \times 10^{10}$ |
| 70* | 60 | 34 | 6 | 10.0 | 67.66 | 7.26 | 21.22 | 1.75 | 2.11 | 6750 | 2.6 | $2 \times 10^7$ |
| 71* | 20 | 60 | 20 | 0 | 67.04 | 2.40 | 19.96 | 3.63 | 6.97 | 6410 | 2.2 | $1 \times 10^7$ |
| 72 | 20 | 60 | 20 | 0.05 | 67.04 | 2.40 | 19.96 | 3.63 | 6.97 | 6030 | 1.1 | $1 \times 10^{10}$ |
| 73 | 20 | 60 | 20 | 0.5 | 67.04 | 2.40 | 19.96 | 3.63 | 6.97 | 5160 | 0.5 | $3 \times 10^{10}$ |
| 74 | 20 | 60 | 20 | 5.0 | 67.04 | 2.40 | 19.96 | 3.63 | 6.97 | 4360 | 1.3 | $2 \times 10^{10}$ |
| 75* | 20 | 60 | 20 | 10.0 | 67.04 | 2.40 | 19.96 | 3.63 | 6.97 | 3000 | 2.7 | $1 \times 10^7$ |

| Sample No. | Basic Ingredients (mol %) | | | MnO (wt part) | Proportion of Oxides | | | | | Electric Properties | | |
|---|---|---|---|---|---|---|---|---|---|---|---|---|
| | A | B | C | | PbO | $Fe_2O_3$ | $Nb_2O_5$ | MgO | $WO_3$ | $\epsilon_s$ | tan δ | I R |
| 76* | 72 | 11 | 17 | 0 | 66.79 | 8.60 | 17.24 | 1.47 | 5.90 | 22650 | 2.0 | $6 \times 10^7$ |
| 77 | 72 | 11 | 17 | 0.001 | 66.79 | 8.60 | 17.24 | 1.47 | 5.90 | 22300 | 0.8 | $2 \times 10^{10}$ |
| 78 | 72 | 11 | 17 | 0.1 | 66.79 | 8.60 | 17.24 | 1.47 | 5.90 | 19700 | 0.6 | $5 \times 10^{10}$ |
| 79 | 72 | 11 | 17 | 0.5 | 66.79 | 8.60 | 17.24 | 1.47 | 5.90 | 18100 | 1.0 | $4 \times 10^{10}$ |
| 80 | 72 | 11 | 17 | 1.0 | 66.79 | 8.60 | 17.24 | 1.47 | 5.90 | 16500 | 1.2 | $2 \times 10^{10}$ |
| 81* | 72 | 11 | 17 | 1.5 | 66.79 | 8.60 | 17.24 | 1.47 | 5.90 | 14200 | 1.8 | $2 \times 10^9$ |
| 82* | 60 | 34 | 6 | 0 | 67.66 | 7.26 | 21.22 | 1.75 | 2.11 | 18120 | 1.2 | $8 \times 10^8$ |
| 83 | 60 | 34 | 6 | 0.005 | 67.66 | 7.26 | 21.22 | 1.75 | 2.11 | 17900 | 0.8 | $4 \times 10^{10}$ |
| 84 | 60 | 34 | 6 | 0.5 | 67.66 | 7.26 | 21.22 | 1.75 | 2.11 | 15800 | 0.7 | $5 \times 10^{10}$ |
| 85 | 60 | 34 | 6 | 1.0 | 67.66 | 7.26 | 21.22 | 1.75 | 2.11 | 13200 | 1.1 | $2 \times 10^{10}$ |
| 86* | 60 | 34 | 6 | 2.0 | 67.66 | 7.26 | 21.22 | 1.75 | 2.11 | 9100 | 2.0 | $7 \times 10^8$ |
| 87* | 45 | 20 | 35 | 0 | 65.82 | 5.30 | 14.05 | 2.87 | 11.96 | 6750 | 2.7 | $2 \times 10^7$ |
| 88 | 45 | 20 | 35 | 0.003 | 65.82 | 5.30 | 14.05 | 2.87 | 11.96 | 6600 | 1.2 | $8 \times 10^{10}$ |
| 89 | 45 | 20 | 35 | 0.1 | 65.82 | 5.30 | 14.05 | 2.87 | 11.96 | 6010 | 0.8 | $6 \times 10^{10}$ |
| 90 | 45 | 20 | 35 | 0.5 | 65.82 | 5.30 | 14.05 | 2.87 | 11.96 | 5200 | 1.3 | $4 \times 10^{10}$ |
| 91* | 45 | 20 | 35 | 1.5 | 65.82 | 5.30 | 14.05 | 2.87 | 11.96 | 4200 | 1.5 | $9 \times 10^8$ |

| Sample No. | Basic Ingredients (mol %) | | | $Li_2O$ (wt part) | Proportion of Oxides | | | | | Electric Properties | | |
|---|---|---|---|---|---|---|---|---|---|---|---|---|
| | A | B | C | | PbO | $Fe_2O_3$ | $Nb_2O_5$ | MgO | $WO_3$ | $\epsilon_s$ | tan δ | I R |
| 92* | 72 | 11 | 17 | 0 | 66.79 | 8.60 | 17.24 | 1.47 | 5.90 | 22650 | 2.0 | $6 \times 10^7$ |
| 93 | 72 | 11 | 17 | 0.01 | 66.79 | 8.60 | 17.24 | 1.47 | 5.90 | 22000 | 1.2 | $9 \times 10^9$ |
| 94 | 72 | 11 | 17 | 0.05 | 66.79 | 8.60 | 17.24 | 1.47 | 5.90 | 19200 | 0.9 | $3 \times 10^{10}$ |
| 95 | 72 | 11 | 17 | 0.1 | 66.79 | 8.60 | 17.24 | 1.47 | 5.90 | 17000 | 0.7 | $5 \times 10^{10}$ |
| 96 | 72 | 11 | 17 | 0.5 | 66.79 | 8.60 | 17.24 | 1.47 | 5.90 | 12500 | 0.7 | $1 \times 10^{10}$ |
| 97 | 72 | 11 | 17 | 2 | 66.79 | 8.60 | 17.24 | 1.47 | 5.90 | 10800 | 1.1 | $7 \times 10^9$ |
| 98* | 72 | 11 | 17 | 5 | 66.79 | 8.60 | 17.24 | 1.47 | 5.90 | 8200 | 5.7 | $5 \times 10^7$ |
| 99* | 45 | 45 | 10 | 0 | 67.51 | 5.43 | 21.11 | 2.44 | 3.51 | 18700 | 2.5 | $2 \times 10^8$ |
| 100 | 45 | 45 | 10 | 0.01 | 67.51 | 5.43 | 21.11 | 2.44 | 3.51 | 18200 | 1.5 | $2 \times 10^{10}$ |
| 101 | 45 | 45 | 10 | 0.05 | 67.51 | 5.43 | 21.11 | 2.44 | 3.51 | 16000 | 1.1 | $4 \times 10^{10}$ |
| 102 | 45 | 45 | 10 | 0.1 | 67.51 | 5.43 | 21.11 | 2.44 | 3.51 | 14000 | 0.9 | $5 \times 10^{10}$ |
| 103 | 45 | 45 | 10 | 0.5 | 67.51 | 5.43 | 21.11 | 2.44 | 3.51 | 9950 | 0.8 | $3 \times 10^{10}$ |
| 104 | 45 | 45 | 10 | 2 | 67.51 | 5.43 | 21.11 | 2.44 | 3.51 | 9000 | 1.3 | $6 \times 10^9$ |
| 105* | 45 | 45 | 10 | 5 | 67.51 | 5.43 | 21.11 | 2.44 | 3.51 | 6300 | 9.8 | $9 \times 10^7$ |

| Sample No. | Basic Ingredients (mol %) | | | $Cr_2O_3$ (wt part) | Proportion of Oxides | | | | | Electric Properties | | |
|---|---|---|---|---|---|---|---|---|---|---|---|---|
| | A | B | C | | PbO | $Fe_2O_3$ | $Nb_2O_5$ | MgO | $WO_3$ | $\epsilon_s$ | tan δ | I R |
| 106* | 72 | 11 | 17 | 0 | 66.79 | 8.60 | 17.24 | 1.47 | 5.90 | 23080 | 2.1 | $8 \times 10^7$ |
| 107 | 72 | 11 | 17 | 0.05 | 66.79 | 8.60 | 17.24 | 1.47 | 5.90 | 23800 | 2.0 | $3 \times 10^9$ |
| 108 | 72 | 11 | 17 | 0.5 | 66.79 | 8.60 | 17.24 | 1.47 | 5.90 | 22700 | 1.8 | $8 \times 10^{10}$ |
| 109 | 72 | 11 | 17 | 1.0 | 66.79 | 8.60 | 17.24 | 1.47 | 5.90 | 20900 | 1.5 | $7 \times 10^{10}$ |
| 110 | 72 | 11 | 17 | 2.0 | 66.79 | 8.60 | 17.24 | 1.47 | 5.90 | 20000 | 1.9 | $2 \times 10^9$ |
| 111* | 72 | 11 | 17 | 3.0 | 66.79 | 8.60 | 17.24 | 1.47 | 5.90 | 17700 | 3.9 | $6 \times 10^7$ |
| 112* | 60 | 34 | 6 | 0 | 67.66 | 7.26 | 21.22 | 1.75 | 2.11 | 18100 | 1.3 | $7 \times 10^8$ |
| 113 | 60 | 34 | 6 | 0.05 | 67.66 | 7.26 | 21.22 | 1.75 | 2.11 | 18380 | 1.0 | $8 \times 10^9$ |
| 114 | 60 | 34 | 6 | 0.5 | 67.66 | 7.26 | 21.22 | 1.75 | 2.11 | 18160 | 0.9 | $9 \times 10^{10}$ |
| 115 | 60 | 34 | 6 | 1.0 | 67.66 | 7.26 | 21.22 | 1.75 | 2.11 | 17920 | 0.8 | $9 \times 10^{10}$ |
| 116 | 60 | 34 | 6 | 2.0 | 67.66 | 7.26 | 21.22 | 1.75 | 2.11 | 17100 | 1.1 | $2 \times 10^{10}$ |
| 117* | 60 | 34 | 6 | 3.0 | 67.66 | 7.26 | 21.22 | 1.75 | 2.11 | 16100 | 3.3 | $8 \times 10^7$ |
| 118* | 45 | 20 | 35 | 0 | 65.82 | 5.30 | 14.05 | 2.87 | 11.96 | 6820 | 2.8 | $2 \times 10^7$ |
| 119 | 45 | 20 | 35 | 0.05 | 65.82 | 5.30 | 14.05 | 2.87 | 11.96 | 6980 | 2.6 | $5 \times 10^9$ |

TABLE 1-continued

| | | | | | | | | | | | |
|---|---|---|---|---|---|---|---|---|---|---|---|
| 120 | 45 | 20 | 35 | 0.5 | 65.82 | 5.30 | 14.05 | 2.87 | 11.96 | 6920 | 2.1 | $1 \times 10^{10}$ |
| 121 | 45 | 20 | 35 | 1.0 | 65.82 | 5.30 | 14.05 | 2.87 | 11.96 | 6780 | 1.8 | $3 \times 10^{10}$ |
| 122 | 45 | 20 | 35 | 2.0 | 65.82 | 5.30 | 14.05 | 2.87 | 11.96 | 6620 | 2.3 | $3 \times 10^{9}$ |
| 123 | 45 | 20 | 35 | 3.0 | 65.82 | 5.30 | 14.05 | 2.87 | 11.96 | 5200 | 4.4 | $8 \times 10^{7}$ |

| Sample No. | Basic Ingredients (mol %) | | | $CeO_2$ (wt part) | Proportion of Oxides | | | | | Electric Properties | | |
|---|---|---|---|---|---|---|---|---|---|---|---|---|
| | A | B | C | | PbO | $Fe_2O_3$ | $Nb_2O_5$ | MgO | $WO_3$ | $\epsilon_s$ | tan δ | I R |
| 124 | 72 | 11 | 17 | 0.05 | 66.79 | 8.60 | 17.24 | 1.47 | 5.90 | 23800 | 2.0 | $3 \times 10^{9}$ |
| 125 | 72 | 11 | 17 | 0.5 | 66.79 | 8.60 | 17.24 | 1.47 | 5.90 | 22700 | 1.8 | $8 \times 10^{10}$ |
| 126 | 72 | 11 | 17 | 1.0 | 66.79 | 8.60 | 17.24 | 1.47 | 5.90 | 20900 | 1.5 | $7 \times 10^{10}$ |
| 127 | 72 | 11 | 17 | 2.0 | 66.79 | 8.60 | 17.24 | 1.47 | 5.90 | 20000 | 1.9 | $2 \times 10^{8}$ |
| 128* | 72 | 11 | 17 | 3.0 | 66.79 | 8.60 | 17.24 | 1.47 | 5.90 | 17700 | 3.9 | $6 \times 10^{7}$ |
| 129 | 60 | 34 | 6 | 0.05 | 67.66 | 7.26 | 21.22 | 1.75 | 2.11 | 18380 | 1.0 | $8 \times 10^{9}$ |
| 130 | 60 | 34 | 6 | 0.5 | 67.66 | 7.26 | 21.22 | 1.75 | 2.11 | 18160 | 0.9 | $9 \times 10^{10}$ |
| 131 | 60 | 34 | 6 | 1.0 | 67.66 | 7.26 | 21.22 | 1.75 | 2.11 | 17920 | 0.8 | $9 \times 10^{10}$ |
| 132 | 60 | 34 | 6 | 2.0 | 67.66 | 7.26 | 21.22 | 1.75 | 2.11 | 17100 | 1.1 | $2 \times 10^{9}$ |
| 133* | 60 | 34 | 6 | 3.0 | 67.66 | 7.26 | 21.22 | 1.75 | 2.11 | 16100 | 3.3 | $8 \times 10^{7}$ |
| 134 | 45 | 20 | 35 | 0.05 | 65.82 | 5.30 | 14.05 | 2.87 | 11.96 | 6980 | 2.6 | $5 \times 10^{9}$ |
| 135 | 45 | 20 | 35 | 0.5 | 65.82 | 5.30 | 14.05 | 2.87 | 11.96 | 6920 | 2.1 | $1 \times 10^{10}$ |
| 136 | 45 | 20 | 35 | 1.0 | 65.82 | 5.30 | 14.05 | 2.87 | 11.96 | 6780 | 1.8 | $3 \times 10^{10}$ |
| 137 | 45 | 20 | 35 | 2.0 | 65.82 | 5.30 | 14.05 | 2.87 | 11.96 | 6620 | 2.3 | $3 \times 10^{9}$ |
| 138* | 45 | 20 | 35 | 3.0 | 65.82 | 5.30 | 14.05 | 2.87 | 11.96 | 5200 | 4.4 | $8 \times 10^{7}$ |

The sintering temperatures of Samples Nos. 1 through 15 and the temperature dependence of the dielectric constant are shown in Table 2, below.

TABLE 2

| Sample No. | Temperature Dependence (%) +85° C. | Sintering Temperature (°C.) |
|---|---|---|
| 1* | +117 | 940 |
| 2 | +25 | 940 |
| 3 | −69.7 | 940 |
| 4 | −18.8 | 940 |
| 5 | −71.8 | 940 |
| 6 | −67.7 | 940 |
| 7 | −65 | 940 |
| 8 | −64.2 | 940 |
| 9 | −45 | 940 |
| 10 | −68.7 | 980 |
| 11* | −51 | 980 |
| 12* | −61 | 980 |
| 13 | −48.2 | 980 |
| 14* | −53.3 | 980 |
| 15* | −66 | 1100 |

Sintering temperatures of Samples No. 92 through 105 are shown in Table 3.

TABLE 3

| Sample No. | Proportion of Oxides | | | | | Sintering Temperature (°C.) |
|---|---|---|---|---|---|---|
| | PbO | $Fe_2O_3$ | $Nb_2O_5$ | MgO | $Li_2O$ | |
| 92* | 66.79 | 8.60 | 17.24 | 1.47 | 0 | 940 |
| 93 | 66.79 | 8.60 | 17.24 | 1.47 | 0.01 | 900 |
| 94 | 66.79 | 8.60 | 17.24 | 1.47 | 0.05 | 860 |
| 95 | 66.79 | 8.60 | 17.24 | 1.47 | 0.1 | 860 |
| 96 | 66.79 | 8.60 | 17.24 | 1.47 | 0.5 | 820 |
| 97 | 66.79 | 8.60 | 17.24 | 1.47 | 2 | 780 |
| 98* | 66.79 | 8.60 | 17.24 | 1.47 | 5 | 750 |
| 99* | 67.51 | 5.43 | 21.11 | 2.44 | 0 | 980 |
| 100 | 67.51 | 5.43 | 21.11 | 2.44 | 0.01 | 940 |
| 101 | 67.51 | 5.43 | 21.11 | 2.44 | 0.05 | 900 |
| 102 | 67.51 | 5.43 | 21.11 | 2.44 | 0.1 | 900 |
| 103 | 67.51 | 5.43 | 21.11 | 2.44 | 0.5 | 860 |
| 104 | 67.51 | 5.43 | 21.11 | 2.44 | 2 | 820 |
| 105* | 67.51 | 5.43 | 21.11 | 2.44 | 5 | 780 |

The sintering temperatures of Samples other than those mentioned in Tables 2 and 3, above, were as follows. The sintering temperature of the control samples was 1000° C. The sintering temperature of the samples according to the present invention was predetermined temperature in the range of from 850° to 950° C.

What we claim is:

1. A high dielectric constant type-, ceramic composition hereinafter referred to as the basic ceramic composition, which comprises from 64.80 to 68.58% of PbO, from o to 11.46% of $Fe_2O_3$, from 0.3 to 3.92% of MgO, from 9.65 to 26.89% of $Nb_2O_5$ and from 0 to 16.83% of $WO_3$, all percentages being by weight based on the basic ceramic composition, and wherein the basic composition falls within the area defined by the polygon A-B-C-D-E of FIG. 1 attached to the specification but not including the lines A-B-C-D-E.

2. A high dielectric constant type-, ceramic composition according to claim 1, wherein the basic composition exhibits a dielectic constant of approximately from 6000 to 23000, a dielectric loss (tan δ at 1 KHz) of from 0.9 to 2.7%.

3. A high dielectric constant type-, ceramic composition according to claim 1, wherein said basic ceramic composition comprises from 66.45 to 68.08% of PbO, from 3.41 to 9.73% of $Fe_2O_3$, 0.99 to 3.03% of MgO, from 16.03 to 24.06% of $Nb_2O_5$ and from 1.42 to 7.93% of $WO_3$, and exhibits a dielectric constant of more than approximately 15000.

4. A high dielectric constant type-, ceramic composition according to claim 3, wherein said basic ceramic composition comprises from 66.7 to 67.2% of PbO, from 8.5 to 9.8% of $Fe_2O_3$, from 17.0 to 18.4% of $Nb_2O_5$, from 0.99 to 1.5% of MgO and from 3.8 to 6.0% of $WO_3$ and exhibits a dielectric constant of approximately 20000 or more.

5. A high dielectric constant type-, ceramic composition according to claim 1, wherein said ceramic composition comprises the basic ceramic composition, and further comprises MnO in an amount of from 0.001 to 1.0 part by weight based on 100 weight parts of the basic ceramic composition.

6. A high dielectric constant type-, ceramic composition according to claim 5, wherein said composition exhibits a dielectric constant (ε s) of from approximately 5200 to 22300 a dielectric loss (tan δ at 1 KHz) of from 0.6 to 1.3%, and an insulation resistance of from $2 \times 10^{10}$ to $5 \times 10^{10} \Omega$.

7. A high dielectric constant type-, ceramic composition according to claim 3, wherein said ceramic composition comprises the basic ceramic composition and further comprises MnO in an amount of from 0.001 to 1.0 part by weight based on 100 weight parts of the basic ceramic composition.

8. A high dielectric constnat type-, ceramic composition according to claim 7, wherein the basic ceramic composition comprises from 66.79 to 67.66% of PbO, from 7.26 to 8.60% if $Fe_2O_3$, from 17.24 to 21.22% of $Nb_2O_5$ and from 1.47 to 1.75% of MgO, and from 2.11 to 5.90% of $WO_3$, and the content of MnO is from 0.001 to less than 0.5 part by weight.

9. A high dielectric constant type-, ceramic composition according to claim 4, wherein said ceramic composition comprises the basic composition and further comprises MnO in an amount of from 0.001 to 1.0 part by weight based on 100 weight parts of the basic ceramic composition.

10. A high dielectric constant type-, ceramic composition according to claim 1, wherein said ceramic composition comprises, the basic ceramic composition and further comprises $Pb(Mn_{2/3}W_{1/3})O_3$ in an amount of from 0.05 to 5.0 parts by weight based on 100 weight parts of the basic ceramic composition.

11. A high dielectric constant type-, ceramic composition according to claim 10, wherein said ceramic composition exhibits a dielectric constant of from approximately 4600 to 17200, a dielectric loss (tan $\delta$ at 1 KHz) of from 0.7 to 1.8%, and an insulation resistance of from $2 \times 10^{10}$ to $6 \times 10^{10} \Omega$.

12. A high dielectric constant type-, ceramic composition according to claim 10, the content of said $Pb(Mn_{2/3}W_{1/3})O_3$ is from 0.05 to 0.5 part by weight, and the basic ceramic composition comprises from 67.49 to 67.66% of PbO, from 7.26 to 10.14% of $Fe_2O_3$, from 19.85 to 21.22% of $Nb_2O_5$, from 0.76 to 1.75% of MgO, and from 1.76 to 2.11% of $WO_3$, and said ceramic composition exhibits as dielectric loss (tan $\delta$ at 1 KHz) of 1.8% or less and a dielectric constant is approximately 10000 or more.

13. A high dielectric constant type-, ceramic composition according to claim 3 or 4, wherein said ceramic composition comprises the basic ceramic composition and further comprises $Pb(Mn_{2/3}W_{1/3})O_3$ in an amount of from 0.05 to 0.5 part by weight based on 100 weight parts of the basic ceramic composition.

14. A high dielectric constant type-, ceramic composition according to claim 1, wherein said ceramic composition comprises the basic ceramic composition, and further comprises $Pb(Mn_{1/2}W_{1/2})O_3$ in an amount of from 0.05 to 5.0 parts by weight based on 100 weight parts of the basic ceramic composition.

15. A high dielectric constant type-, ceramic composition according to claim 14, wherein said ceramic composition exhibits a dielectric constant of from approximately 4700 to 17300, a dielectric loss (tan $\delta$ at 1 KHz) of from 0.6 to 1.9%, and an insulation reistance of from $1 \times 10^{10}$ to $4 \times 10^{10} \Omega$.

16. A high dielectric constant type-, ceramic composition according to claim 14, wherein the basic ceramic composition comprises from 67.49 to 67.66% of PbO, from 7.26 to 10.14% of $Fe_2O_3$, from 19.85 to 21.22% of $Nb_2O_5$, from 0.76 to 1.75% of MgO and from 1.76 to 2.11% of $WO_3$, the content of said $Pb(Mn_{1/2}W_{1/2})O_3$ is from 0.05 to 0.5 part by weight and said ceramic composition exhibits a dielectric constant of approximately 10000 or more and a dielectric loss (tan $\delta$ at 1 KHz) of 1.3% or less.

17. A high dielectric constant type-, ceramic composition according to claim 3 or 4, wherein said ceramic composition comprises the basic ceramic composition, and further comprises $Pb(Mn_{1/2}W_{1/2})O_3$ in an amount of from 0.05 to 0.5 part by weight based on 100 weight parts of the basic ceramic composition.

18. A high dielectric constant type-, ceramic composition according to claim 1, wherein said ceramic composition comprises the basic ceramic composition, and further comprises $Pb(Mn_{1/3}Nb_{2/3})O_3$ in an amount of from 0.05 to 5.0 parts by weight based on 100 weight part of the basic ceramic composition.

19. A high dielectric constant type-, ceramic composition according to claim 18, wherein said ceramic composition exhibits a dielectric constant of from approximately 4800 to 17200, a dielectric loss (tan $\delta$ at 1 KHz) of from 0.4 to 2%, and an insulation resistance of from $2 \times 10^{10}$ to $6 \times 10^{10} \delta$.

20. A high dielectric constant type-, ceramic composition according to claim 3, wherein said ceramic composition comprises the basic ceramic composition, and further comprises $Pb(Mn_{1/3}Nb_{2/3})O_3$ in an amount of from 0.05 to 0.5 parts by weight based on 100 weight parts of the basic ceramic composition.

21. A high dielectric constant type-, ceramic composition according to claim 20, wherein said basic ceramic composition comprises from 67.49 to 67.66% of PbO, from 7.26 to 10.14% of $Fe_2O_3$, from 19.85 to 21.22% of $Nb_2O_5$, from 0.76 to 1.75% of MgO and from 1.76 to 2.11% of $WO_3$.

22. A high dielectric constant type-, ceramic composition according to claim 4, wherein said ceramic composition comprises the basic ceramic composition and further comprises $Pb(Mn_{1/3}Nb_{2/3})O_3$ in an amount of from 0.05 to 0.5 parts by weight based on 100 weight parts of the basic ceramic composition.

23. A high dielectric constant type-, ceramic composition according to claim 1, wherein said ceramic composition comprises the basic ceramic composition and further comprises $Pb(Mn_{1/3}Ta_{2/3})O_3$ in an amount of from 0.05 to 5.0 parts by weight based on 100 weight parts of the basic ceramic composition.

24. A high dielectric constant type-, ceramic composition according to claim 23, wherein said ceramic composition exhibits a dielectric constant of from approximately 4360 to 18200, a dielectric loss (tan $\delta$ at 1 KHz) of from 0.4 to 1.7% and an insulation resistance of from $1 \times 10^{10}$ to $6 \times 10^{10} \Omega$.

25. A high dielectric constant type-, ceramic composition according to claim 3, wherein said ceramic composition comprises the basic ceramic composition, and further comprises $Pb(Mn_{1/3}Ta_{2/3})O_3$ in an amount of from 0.05 to 0.5 parts by weight based on 100 weight parts of the basic ceramic composition.

26. A high dielectric constant type-, ceramic composition according to claim 25, wherein said basic composition comprises preferably from 67.49 to 67.66% of PbO, from 7.26 to 10.14% of $Fe_2O_3$, from 19.85 to 21.22% of $Nb_2O_5$, from 0.76 to 1.75% of MgO and from 1.76 to 2.11% of $WO_3$.

27. A high dielectric constant type-, ceramic composition according to claim 4, wherein said ceramic composition comprises the basic ceramic composition, and further comprises $Pb(Mn_{1/3}Ta_{2/3})O_3$ in an amount of from 0.05 to 0.5 parts by weight based on 100 weight parts of the basic ceramic composition.

28. A high dielectric constant type-, ceramic composition according to claim 1, wherein said ceramic composition comprises the basic ceramic composition, and further comprises $Li_2O$ in an amount of from 0.01 to 2.0 parts by weight based on 100 weight parts of the basic ceramic composition.

29. A high dielectric constant type-, ceramic composition according to claim 28, wherein said ceramic composition exhibits a dielectric constant of from approximately 9000 to 22000, and a dielectric loss (tan $\delta$ at 1 KHz) of from 0.7 to 1.5%.

30. A high dielectric constant type-, ceramic composition according to claim 29, wherein said basic ceramic composition comprises from 66.7% to 67.51% of PbO, from 5.43 to 8.60% of $Fe_2O_3$, from 17.24 to 21.11% of $Nb_2O_5$, from 1.47 to 2.44% of MgO and from 3.51 to 5.90% of $WO_3$, content of said $Li_2O$ is from 0.01 to 0.1 part by weight, and said ceramic composition exhibits a dielectric constant of approximately 14000 or more.

31. A high dielectric constant type-, ceramic composition according to claim 30, wherein said basic ceramic composition comprises from 66.79 to 67.00% of PbO, from 8.00 to 8.60% of $Fe_2O_3$, 17.24 to 18.00% of $Nb_2O_5$, from 1.47 to 1.60% of Mgo and from 5.00 to 5.90% of $WO_3$, and the content of said $Li_2O$ is from 0.01 to 0.05.

32. A high dielectric constant type-, ceramic composition according to claim 1, wherein said ceramic composition comprises the basic ceramic composition, and further comprises at least one member selected from the group consisting of $Cr_2O_3$ and $CeO_2$ in an amount of from 0.05 to 2.0 parts by weight based on 100 parts of the basic ceramic composition.

33. A high dielectric constant type-, ceramic composition according to claim 32, wherein said ceramic composition exhibits a dielectric constant of from approximately 6620 to 23800, a dielectric loss (tan $\delta$ at 1 KHz) of from 0.8 to 2.6%, and an insulation resistance of from $2 \times 10^9$ to $9 \times 10^{10} \Omega$.

34. A high dielectric constant type-, ceramic composition according to claim 3, wherein said ceramic composition comprises the basic ceramic composition, and further comprises at least one member selected from the group consisting of $Cr_2O_3$ and $CeO_2$ in an amount of from 0.5 to 1.0 parts by weight based on 100 parts of the basic ceramic composition.

35. A high dielectric constant type-, ceramic composition according to claim 34, wherein said basic ceramic composition comprises from 66.79 to 67.66% of PbO, from 7.26 to 8.60% of $Fe_2O_3$, from 17.24 to 21.22% of $Nb_2O_5$ and from 1.47 to 1.75% of MgO, and from 2.11 to 5.90% of $WO_3$.

36. A high dielectric constant type-, ceramic composition according to claim 4, wherein said ceramic composition comprises the basic ceramic composition, and further comprises at least one member selected from the group consisting of $Cr_2O_3$ and $CeO_2$ in an amount of from 0.5 to 1.0 part by weight based on 100 parts of the basic ceramic composition.

37. A high dielectric constant type-, ceramic composition according to claim 1, wherein the basic composition exhibits a dielectric constant of approximately from 6000 to 23000, a dielectric loss (tan $\delta$ at 1 KHz) of from 0.9 to 2.7%.

38. A high dielectric constant type-, ceramic composition according to claim 1, wherein said ceramic composition comprises the basic ceramic composition, and further comprises $Pb(Mn_{1/3}Nb_{2/3})O_3$ in an amount of from 0.05 to 5.0 parts by weight based on 100 weight part of the basic ceramic composition.

39. A high dielectric constant type-, ceramic composition according to claim 38, wherein said ceramic composition exhibits a dielectric constant of from approximately 4800 to 17200, a dielectric loss (tan $\delta$ at 1 KHz) of from 0.4 to 2%, and an insulation resistance of from $2 \times 10^{10}$ to $6 \times 10^{10} \Omega$.

40. A high dielectric constant type-, ceramic composition according to claim 1, wherein said ceramic composition comprises the basic ceramic composition and further comprises $Pb(Mn_{1/3}Ta_{2/3})O_3$ in an amount of from 0.05 to 5.0 parts by weight based on 100 weight parts of the basic ceramic composition.

41. A high dielectric constant type-, ceramic composition according to claim 40, wherein said ceramic composition exhibits a dielectric constant of from approximately 4360 to 18200, a dielectric loss (tan $\delta$ at 1 KHz) of from 0.4 to 1.7% and an insulation resistance of from $1 \times 10^{10}$ to $6 \times 10^{10} \Omega$.

* * * * *

UNITED STATES PATENT AND TRADEMARK OFFICE
CERTIFICATE OF CORRECTION

PATENT NO. : 4,287,075
DATED : September 1, 1981
INVENTOR(S) : Shinobu Fujiwara, et al It is certified that error appears in the above—identified patent and that said Letters Patent is hereby corrected as shown below:

Col. 1, line 66, correct spelling of "electrodes".

Col. 3, line 23, change "cera mic" to --ceramic--.

Col. 3, line 57, change "the" to --The--.

Col. 2, line 65, after "Pb(Mg$_{1/3}$Nb$_{2/3}$)O$_3$--" delete one dash.

Col. 4, line 9, same as above: delete one dash (-) between "O$_3$" and "Pb".

Col. 4, line 13, correct spelling of "defined".

Col. 4, line 24, correct spelling of "defined".

Col. 4, line 33, change "(tan $\varepsilon$ at 1 KH$_z$)" to --(tan $\delta$ at 1 KH$_z$)--.

Col. 5, line 4, correct spelling of "hereinbefore".

Col. 5, line 42, change "($\delta$s) to --($\varepsilon$s)--.

Col. 5, line 62, change "per" to --pre--.

Col. 6, line 3, change "($\delta$s)" to --($\varepsilon$s)--.

Col. 6, line 4, change "(tan $\varepsilon$s)" to --(tan $\delta$ s)--.

Col. 6, line 7, change "compresses" to --comprises--.

Col. 6, line 34, change "0.51" to --0.5--.

Col. 6, line 40, correct spelling of "lower".

Col. 7, line 1, correct spelling of "constant".

UNITED STATES PATENT AND TRADEMARK OFFICE
CERTIFICATE OF CORRECTION

PATENT NO. : 4,287,075
DATED : September 1, 1981
INVENTOR(S) : Shinobu Fujiwara, et al It is certified that error appears in the above—identified patent and that said Letters Patent is hereby corrected as shown below:

Col. 7, line 10, first series, change "$Pb(Mn_{1/2}W_{1/3})O_3$" to --$Pb(Mn_{1/2}W_{1/2})O_3$--

Col. 7, line 50, correct spelling of "constant".

Col. 7, line 50, correct spelling of "more".

Col. 8, line 41, correst spelling of "weighed".

Col. 10, in Table One, under $Nb_2O_5$, third line down, change "13.32" to --18.32--.

Col. 10, in Table One, third section, under $Nb_2O_5$, first column down, change "10.85" to --19.85--.

Col. 13, line 26, correct spelling of "in--.

Col. 14, line 29, after "which" delete "comprises" and insert --consists essentially of--.

Col. 15, line 7, correct spelling of "constant".

Col. 15, line 10, change "if" to --of--.

Col. 15, line 21, after "to claim 1" insert --or 2,--.

Col. 15, line 50, after "to claim 1" insert --or 2,--.

Col. 15, line 59, correct spelling of "resistance".

UNITED STATES PATENT AND TRADEMARK OFFICE
CERTIFICATE OF CORRECTION

PATENT NO. : 4,287,075
DATED : September 1, 1981
INVENTOR(S) : Shinobu Fujiwara, et al Page 3 of 3

It is certified that error appears in the above—identified patent and that said Letters Patent is hereby corrected as shown below:

Col. 16, line 20, after " $6 \times 10^{10}$ ", change " $\delta$ " to -- $\eta$ --.

Col. 17, line 2, after "claim 1" insert --or 2,--.

Col. 17, line 29, after "claim 1" insert --or 2,--.

Signed and Sealed this

Sixteenth Day of March 1982

|SEAL|

*Attest:*

GERALD J. MOSSINGHOFF

*Attesting Officer*   *Commissioner of Patents and Trademarks*